Aug. 27, 1946.    T. R. GRIFFITH ET AL    2,406,367
PREVENTION AND REMOVAL OF ICE OR FROST ON AIRCRAFT PARTS
Filed Nov. 10, 1944
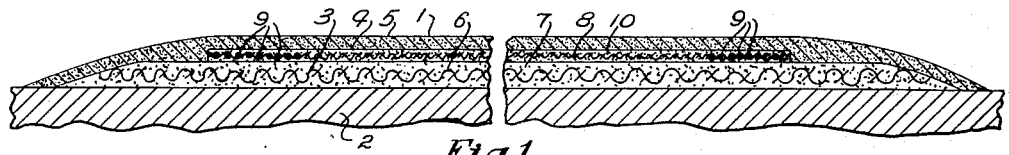
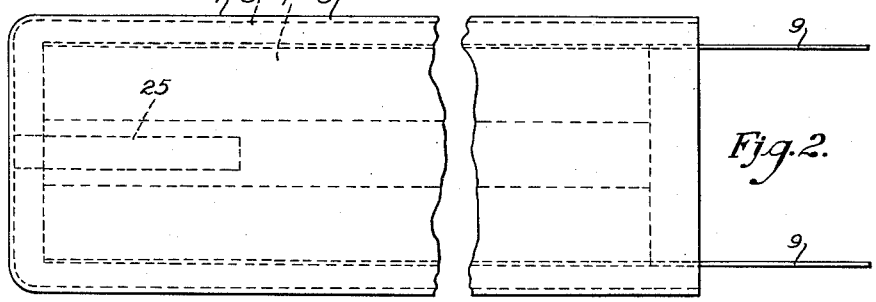
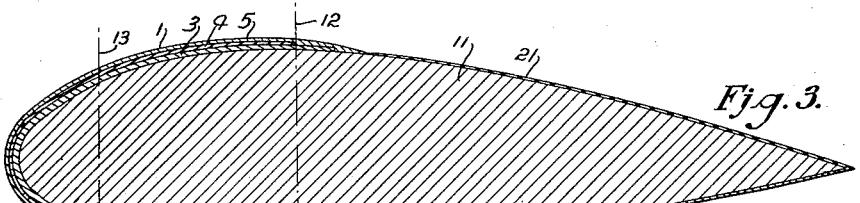
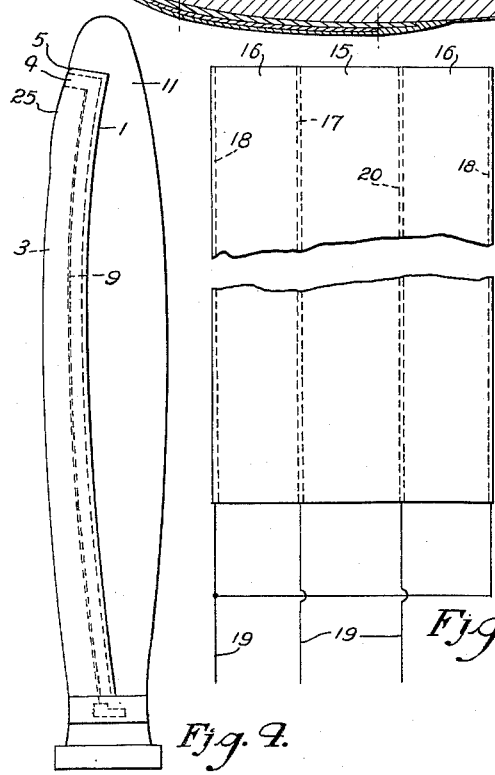
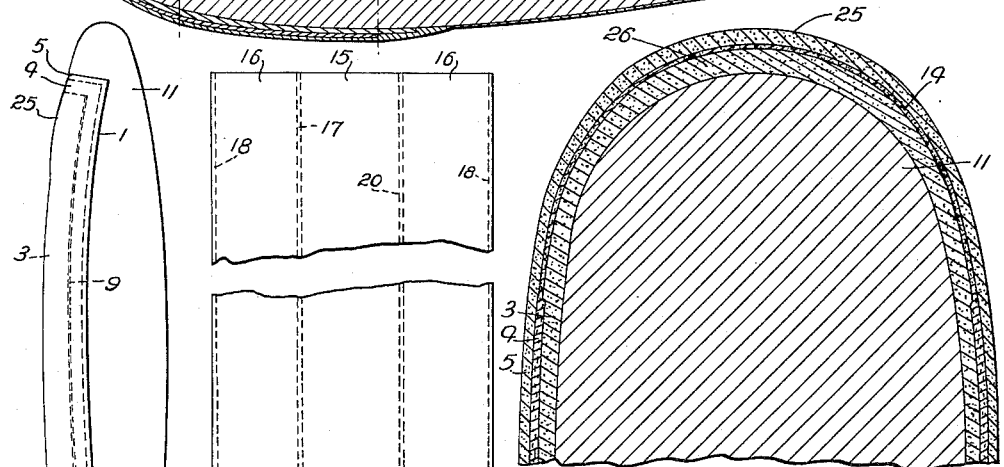
Inventors:
T. R. Griffith and J. L. Orr
By Alex. E. MacRae
Attorney.

Patented Aug. 27, 1946

2,406,367

UNITED STATES PATENT OFFICE 2,406,367

PREVENTION AND REMOVAL OF ICE OR FROST ON AIRCRAFT PARTS

Thomas Raymond Griffith and John Lewis Orr, Ottawa, Ontario, Canada, assignors to The Honorary Advisory Council for Scientific and Industrial Research, Ottawa, Ontario, Canada, a corporation of Canada Application November 10, 1944, Serial No. 562,878

10 Claims. (Cl. 244—134)

This invention relates to heating means such as may be used for the prevention and removal of ice or frost on aircraft parts and is a division in part of copending application Serial Number 493,700, filed July 7, 1943.

The hazards resulting from the formation of ice on certain portions of aircraft surfaces particularly the airfoils during flight are well known and many attempts have been made to provide means for preventing or removing such ice formations. Up to the present time, no completely satisfactory means has been provided for this purpose. Some of the means heretofore proposed have been found unsatisfactory because they change the contour of the surface to which they are applied, usually resulting in adverse aerodynamic effects. This necessity for maintaining the carefully designed contours of aircraft parts constitutes a serious problem in the provision of de-icing means for such parts.

Without doubt, that part of the aircraft on which ice formation produces the greatest hazard is the propeller and this hazard occurs at an earlier stage, during icing conditions, than that resulting from ice formation on the wings due to scald effects. The contour of propeller blades is carefully shaped in order to achieve the maximum thrust with minimum torque. Any change in the contour, as by ice formation, greatly reduces this thrust and this is accompanied by increased torque which requires more power to attain a given air speed. Of course, any means for preventing or removing ice must not result in any substantial change in this contour. Moreover, the material of the blade structure should not be abruptly altered in surface contour because such alteration would seriously affect the fatigue resistance of the material.

It is an object of this invention to provide an electrical heating means adapted to prevent or remove ice formation on exposed surfaces, such means having an overall thickness so small that, when applied to presently existing surfaces of aircraft parts, the slight resulting change in contour of such parts does not seriously affect the normal aerodynamic or other functions thereof.

While the invention has reference to the prevention of ice formation on aircraft parts, it particularly contemplates the successive shedding of ice formations which build up on propeller blades before such formations become so thick as to constitute a hazard. The shedding of such formations is usually accomplished by applying sufficient heat to the blade surface to cause melting of a small portion of the ice formation to provide a liquid layer between the ice and the blade, and the consequent reduction of the adhesion of the ice to the blade. Thereafter, the centrifugal force acting on the ice (as a result of revolution of the propeller) will cause shedding of the ice. It will be understood, however, that sufficient heat may be applied to melt all of the ice.

The invention contemplates the provision of a sheet type of heating means whose overall thickness throughout at least substantially 85% of its area, including heating element and insulation thereof, does not substantially exceed 0.065 inch but in which sufficient heat is generated to prevent or cause removal of ice formation on parts exposed to any natural icing conditions. The invention further contemplates the provision of a sheet heater which may be applied to surfaces of varying curvatures.

Other objects, details, and advantages of the invention will become apparent as the description of the invention proceeds with particular reference to the accompanying drawing, in which Figure 1 is a greatly enlarged sectional elevation of one form of heating means in accordance with the invention, Figure 2 is a diagrammatic plan view of the heating means, Figure 3 is a sectional view of the heating means in somewhat exaggerated form applied to a propeller blade, Figure 4 is a side elevation of the propeller blade, Figure 5 is a partial sectional elevation of a specific type of propeller blade heating means, and Figure 6 is a diagrammatic view of a particular arrangement of power supply connection for the heating means.

Referring to Figures 1 and 2, the heater 1 is shown as applied directly to the surface of a member 2 on which ice is to be removed or its formation prevented.

The heater comprises an inner insulating or electrically non-conducting layer 3, an intermediate electrically conducting layer 4 constituting a heating element, and an outer protective and electrically non-conducting layer 5. The insulating layer and the protective layer each extend beyond the edges of the heating element to enclose completely the latter.

The heater may be constructed either directly in position on the part to which it is to be applied or it may be constructed separately on a form conforming in shape to the part to which the heater is to be applied. Alternatively, the heater may be formed as a flat flexible sheet and wrapped around or otherwise made to conform to the contour of the surface to which it is applied. Each layer may be formed independently.

The insulating layer 3 is preferably formed on a fabric base 6 of sufficient weight to give effective electrical insulation. A suitable fabric for the purpose is square woven cotton fabric having an approximate weight of 5 ozs. per sq. yd. and a yarn count of 55 per inch in the warp and 32 per inch in the weft. The fabric is impregnated with a suitable non-conducting compound 7. A satisfactory compound for the purpose is composed of the following ingredients:

|  | Parts by weight |
|---|---|
| Neoprene type G | 100 |
| Magnesium oxide | 4 |
| Zinc oxide | 5 |
| Thermatomic carbon black | 60 |
| Phenyl-b-naphthylamine | 2 |
|  | 171 |

The ingredients are mixed on a rubber mill and are then added to a solution, the composition of which is as follows:

| Compound as above | grams | 600 |
|---|---|---|
| Hydrogenated gasoline | cc | 2250 |
| Toluol | cc | 750 |

The solution is churned or otherwise agitated to render it homogeneous. The fabric is then impregnated with the solution by dipping, brushing or spraying. It may also be coated by spreading or calendering. The thickness of the treated fabric or completed layer should not exceed about 0.030 inch.

The heating element or conducting layer 4 may also be formed on a fabric base 8 which, however, should be much lighter than the fabric of layer 3. A square woven cotton fabric having an approximate weight of 2 ozs. per sq. yd. and a yarn count of 58 per inch in the warp and 47 per inch in the weft has been used but other fabrics, such as nylon or rayon or a fabric made from glass fibers, may be employed to give a thinner structure. The thickness of the heater element will not usually exceed about 0.015 inch. A pair of any suitably formed electrodes 9 are provided for the element, such electrodes extending along the longitudinal edges of the element.

A suitable material for each electrode comprises tinned copper braid. For example, a braid of 16 x 5 x 36 gage having 80 strands is satisfactory. Suitable overall dimensions for the electrode are 0.0175" thick and $\frac{1}{16}$" wide. Braided wire is preferably employed for the electrodes since the braiding keeps the wires together during assembly of the unit. A further advantage of the braided wire is that it permits shortening of the electrode without buckling. The electrodes may be woven or otherwise fastened to the fabric.

The fabric is now impregnated and coated with an electrically conducting compound 10, which may be composed of the following ingredients:

|  | Parts by weight |
|---|---|
| Neoprene type G | 100 |
| Magnesium oxide | 4 |
| Zinc oxide | 5 |
| Phenyl-b-naphthylamine | 2 |
| Shawinigan acetylene black | 25 |
|  | 136 |

Shawinigan acetylene or like black is known as a black obtained by the thermal decomposition of acetylene into carbon and hydrogen with subsequent collection of the black and burning of the hydrogen (in the presence of the black) with air.

Such a black has distinctive characteristics as compared with ordinary carbon or channel black. It imparts to a mass, in which it is incorporated, a conductivity so effective in generating heat therein upon passage of an electric current at a conveniently low voltage that a very thin sheet of such a mass provides an effective heating element for the purposes of the present invention. Care must be taken, however, in handling the acetylene black to avoid injury thereto. Milling of the black, for instance, adversely affects its desirable conductive characteristics.

The black is therefore preferably incorporated in the compound in the following manner:

The ingredients mentioned, with the exception of the acetylene black, are mixed on a rubber mill the action of which would be injurious to the acetylene black particles. The mixed ingredients and the acetylene black are then added to a solvent and agitated, the resulting solution having the following composition in the proportions given by way of example,

| Mixed ingredients | grams | 460 |
|---|---|---|
| Shawinigan acetylene black | do | 160 |
| Hydrogenated gasoline | cc | 3600 |
| Toluol | cc | 1000 |

The prepared solution is then applied to the fabric by brushing or spraying. Preferably a number of coats are applied, say, 20 to each side of the fabric when the solution is applied by brushing, each coat being allowed to dry before application of the next. The thickness of the resulting sheet constituting the heater element is about 0.023 inch. Its conductivity should be such as to provide a power input of at least 1.5 watts per square inch.

A sheet element prepared as described, of a size approximately 48" by 7", with an applied voltage of about 100 to 125 and a power input of 2 to 3 watts per square inch or a total input of about 700 to 1050 watts, has an overall resistance of about 15 ohms corresponding to a specific resistivity of 3.12 ohm-centimeters, and is thus quite satisfactory for the purposes of the present invention. It is more or less essential that an element be employed of such conductivity that low voltages of, say, 110, or lower, are sufficient for operation thereof. The element described operates satisfactorily at voltages not exceeding 150, and the employed voltage need never exceed 220. The conductivity of the element, and likewise its resistivity, may be varied by altering in the described manner the proportion of Shawinigan acetylene black employed in the formation thereof or by milling the black slightly.

The resistivity of the element described will not be more than 10 ohm-centimeters and will preferably be less than 5 ohm-centimeters. In some instances such resistivity will be as low as 0.4 ohm-centimeter. The following table gives by way of example some instances of the relation of resistivity to the composition of the element:

| Parts acetylene black to 100 parts neoprene or like | Resistivity in ohm-centimeters |
|---|---|
| 20 | 10 |
| 25 | 5 |
| 33 | 2 |
| 40 | 1 |
| 55 | 0.4 |

The sheet element described is electrically substantially isotropic or but slightly anisotropic in the plane of the sheet. For example, in sheets comprising 30 parts acetylene black and 100 parts neoprene and prepared by brushing, the average resistivity parallel to the direction of brushing was found to be approximately 2.74 ohm cm. and at right angles to the direction of brushing 2.97 ohm cm., an average difference of 0.23 ohm cm., or 8.4%. The electrical anisotrophy is generally less than 10%, and in no case has it exceeded 15%.

With the layers 3 and 4 prepared, the heater may be assembled on a form or on the surface to which it is to be finally applied. If on the latter, the surface, usually metal, may be sandblasted or otherwise prepared, as by anodizing of a duralumin surface, and a suitable metal-to-rubber adhesive is employed to firmly affix the layer 3 thereto. If on the former, the layer 3 is firmly but removably fastened thereto to provide a firm and uniform contact at all points between the layer and form. The heating element 4 is then adhesively applied to layer 3. A coating of the insulating solution employed in the formation of layer 3 may be used as the adhesive. The protective layer 5 is then applied by dipping, brushing or spraying, or as a calendered sheet. The solution described in the formation of layer 3 may be employed for layer 5. The thickness of the completed layer may be approximately 0.0075 to 0.015 inch.

It will be observed that the inner layer 3 is about three times thicker than the outer layer 5. The inner layer must be sufficiently thick to prevent undue heat loss into the surface to which it is applied. On the other hand, the outer layer must be thin enough to transmit sufficient heat to the surface thereof to accomplish the desired melting of ice, and is preferably of just sufficient thickness to protect the heater from abrasion and erosion. In some instances, and especially in the case where the heating element is of sufficiently tough composition to withstand abrasion and erosion, the outer layer 5 may be dispensed with entirely.

The following are examples of suitable thicknesses of the heating means and layers thereof:

|         | (1)  | (2)    | (3)   | (4)   | (5)    | (6)   |
|---------|------|--------|-------|-------|--------|-------|
| Layer 3 | 0.03 | 0.0275 | 0.025 | 0.015 | 0.0395 | 0.030 |
| Layer 4 | 0.01 | 0.0100 | 0.015 | 0.020 | 0.005  | 0.023 |
| Layer 5 | 0.01 | 0.0075 | 0.010 | 0.000 | 0.0155 | 0.012 |
|         | 0.05 | 0.0450 | 0.050 | 0.035 | 0.0600 | 0.065 |

While the insulating layer 3 and the heater layer 4 have been described as provided with a fabric base, it will be understood that this base may be omitted and such layers formed as built-up films of the compositions described. The fabric base is of utility, however, in many instances. It simplifies the formation of the layer. It prevents stretching of the finished device and thus, when the device is to be applied to a surface of double curvature, it prevents flow of the material and consequent undesired thickening or thinning of portions of the device thereby altering the distribution of heating effects. The fabric also provides a simple mounting means for the electrode wires in the heating element and in layer 3 prevents such wires from coming into contact with the metal or other surface on which the heater assembly is formed.

The assembled heater is subjected to a curing and bonding operation to produce a substantially inseparable structure. This operation may be carried out by utilizing the usual rubber bag or any alternative procedure for bonding laminated structures wherein uniform pressure and/or heat are applied to the structure.

Referring to Figures 3 and 4, the propeller blade 11 has the heating means 1 applied to the leading edge thereof. It will be observed that the heater extends to about the 35% chord of the blade, as indicated by the line 12 or, in other words, to approximately the points at which the blade is of maximum thickness. Flight experiments under natural icing conditions have shown that a heater of such extent is sufficient to maintain the blade in substantially de-iced condition, since ice tends to form primarily on and adjacent the leading edge. It will, however, be understood that the heater may be of greater or less extent, as desired. Thus, the chordwise extent of the heated area may vary from 20% to 100%.

The ice formation is greatest at the leading edge and the "rime" type of icing in particular forms on the leading edge region only. This ice formation provides heat insulation over a limited portion of the heater and the after portions of the heater and blade being exposed to the slip stream dissipate heat generated at the leading edge region as well as heat generated in the after region. Therefore it is contemplated that a heater providing an increased concentration of heat in the leading edge region may be employed. Such region is roughly that extending back approximately to the 10% chord, indicated by the line 13. This heat concentration may be effected by increasing the resistance of the corresponding portion of the element 4, and is conveniently carried out by varying the thickness of this portion of the element. Figure 5 illustrates a heater embodying this feature. As shown, the leading edge portion 14 of the element is of considerably less thickness than the remaining portion. The thickness of such portion 14 may be about 0.005 to 0.006 inch where the remaining portion is .01" thick, or about 0.017 inch where the remaining portion is 0.023 inch thick. The thickness of the inner insulating layer 3 may be increased in this area in order to maintain uniform thickness of the unit. Alternatively, the conductivity of the leading edge portion may be controlled as desired by varying the proportion of acetylene black in the leading edge portion of the conductive layer. It has been determined by flight tests under natural icing conditions that a power input of about 4.0 watts per square inch for that portion of the heater from the leading edge aft to about the 10% chord and of about 2.0 watts per square inch from the 10% chord to the 35% chord is satisfactory.

Figure 6 illustrates another form of heating element which includes a centrally extending portion 15 and the adjacent portions 16. Two wires 18 at the outside edges of the portion 16, connected as shown, and wires 17 and 20 at opposite edges of the central portion 15 are connected to a three-phase power supply 19. The wires 18, the wire 17 and the wire 20 constitute three electrodes, respectively, in the element. The concentration of heat in the portion 15 may be achieved in this form of element by varying the spacing of the different electrodes or by employing a suitable source of power to vary the voltage applied to the different electrodes.

The radial extent of the propeller blade heater is preferably from a point as close as possible to the blade root to a point as close as possible to the blade tip. However, since erosion and abrasion are more severe in the blade tip region, it is proposed to terminate the heater at a point about six inches from the tip. The spanwise extent of the heater may, of course, vary from the root of the blade to 50 to 100% of its length.

The radial distribution of the power input may be varied by increasing the power input to the root region to allow for reduced centrifugal forces in this region and to compensate for the lesser kinetic heating of the root, owing to its slower speed in its passage through the air. This heating is more pronounced at the tips and tends to reduce losses of heat from the element in this part of the blade. This variation of radial power distribution may be effected by varying the thickness or conductivity of the conducting layer or the spacing of the electrodes.

The invention also contemplates the provision of means for resisting the increased erosion and abrasion and deterioration of the unit adjacent the tip of the propeller blade caused by the impact of rain drops, sand particles and the like. The tip of a propeller blade travels through the air at approximately the speed of sound, and the maximum pressure created upon impact with rain drops is calculated to be about 20,000 lbs. per square inch. Such an impact pressure is sufficient to cause erosion of the metal itself. Since the outer protective film 5 is backed by the relatively hard and inelastic heater element 4, the film 5 must have sufficient resiliency and thickness to soften the impact of particles thereagainst, thereby reducing the pressure created without sustaining injury thereto as by tearing. Should this film be torn by impact of particles, and rain drops thus break through the same, the impact pressure and centrifugal force will cause the water to flow into the fabric fibres of the heater element, forcing the rubber plies thereon outwardly and destroying the bond between such plies and the fabric base. Maintenance intact of the outer protective layer 5 is thus essential to ensure good condition of the device as a whole. The compound hereinbefore described for production of the layer 5 results in a film of soft, resilient rubber which presents a soft cushion to receive particle impacts. It is of course desirable that the particles sink as far as possible into the rubber cushion before being stopped, i. e., so that the particle will be stopped in the longest possible distance and therefore by the lowest possible force, resulting in minimum pressure.

It has been found that a protective layer 5 of the thickness hereinbefore mentioned is effective in resisting impact pressure throughout substantially the major portion of the device. However, since the impact pressure is greatly increased in the immediate propeller tip section of the blade, it is proposed to increase the thickness of the protective layer 5 in this section. The section wherein such thickening is desirable is of relatively small extent and is indicated at 25 in the drawing. Thus, in a heater having overall dimensions of 50" x 8½" with a heating element 47" x 6½", the thickened area may be 8" x 1". The amount of such thickening is, for instance, about 0.012".

Since, however, this extra thickness will increase the resistance to outward heat flow from the conducting layer 4 to the surface of the device, the thickness of the insulating layer 3 must also preferably be increased. The amount of heat that will flow from the element 4 to the outside surface where it is needed is greater or less than the amount that will flow inwardly towards the blade where it is lost, according as the thickness of the inner insulating layer 3 is respectively greater or less than the thickness of the outer protective layer 5. In order, therefore, to employ heat most efficiently, the heat flow inwardly is resisted by increasing the thickness of that portion of the insulating layer 3 opposite to the thickened portion 25 of layer 5 by about the same amount, i. e., approximately 0.012". This thickened portion is indicated at 26 in the drawing.

In order to preserve the aerodynamic qualities of the propeller blade, it is necessary that the leading edge of the blade retain its original sharpness. Thus, the extra thickness described is applied only to the leading edge while on the sides of the blade, where the effect of impact is not relatively very great, the overall thickness of the device is kept as low as possible to prevent formation of shock waves as the speed of sound is approached. In a heater having an overall thickness of, say, 0.065" throughout its major portion, the overall thickness of the thickened portion at the leading edge tip is about 0.090".

The assembly, curing, and application of the heater device to a propeller blade or other aircraft part may be carried out as described in copending application, Serial No. 493,700, filed July 7, 1943.

Any suitable means for supplying electrical power to the heater may be employed in flight, such as a brush and slip ring arrangement for transferring power from the aircraft electrical system or a hub generator or rotating transformer whose stationary field is excited from the aircraft electrical system.

In order to reduce heat loss through the exposed or uncovered rear portion of the blade, this portion may be coated with a suitable insulating layer, such as a rubber paint, as indicated at 21. The thickness of this coating need not substantially exceed 0.01 inch.

It will be apparent that various changes may be made in the described details within the contemplated scope of the invention. Thus, the composition of the heating element itself may vary within relatively wide limits providing the desired range of thickness and conductivity thereof is achieved. The proportion of acetylene black to the base matrix material, such as neoprene, may vary from 15 to 80 parts black to 100 parts matrix. It is, however, desirable to employ a low proportion of black, such as 25 parts, since the resulting product is of a more flexible and satisfactory nature. It should be noted that the use of an unmilled black in a heater structure as described makes possible the satisfactory use of such low proportions of black in order to provide a heater of desired electrical proportions. A range of from 20 to 55 parts black to 100 parts matrix is to be preferred. Instead of neoprene, other synthetic or natural rubbers may be used, as well as any other suitable base material, such as synthetic plastic materials, for instance, phenol formaldehyde, urea formaldehyde, polystyrene, cellulose acetate, nitrocellulose, or combinations thereof, and the like. If the heater element is to be flexible, there is employed a flexible material for carrying the acetylene black, such as ethyl cellulose, butyl rubber, plasticized polyvinyl chloride, vinylite, polyvinyl butyral. The following additional conductive compositions are given by way of example:

| | Parts |
|---|---|
| (1) 60% phenol-formaldehyde solution (partially polymerized) | 100 |
| Shawinigan acetylene black | 15 |
| Thinner (3:2 methanol: toluene) | 67 |
| (2) Urea formaldehyde | 100 |
| Shawinigan acetylene black | 15 |
| Hardener | 7 |
| Water | 250 |
| (3) Plasticized polyvinyl chloride | 100 |
| Acetylene black | 25 |
| Monochlor toluene | 500 |

If the heater element is of a hard plastic material, the inner insulating layer should also be of hard plastic material containing any suitable filler which does not render the layer electrically conductive. The outer exposed protective layer is preferably of soft elastic composition to resist abrasion. If the heater element is of a soft plastic material, the inner insulating layer may be of either hard or soft plastic material. The outer exposed protective layer may in this case be of a soft elastic material.

The term "unmilled" when applied to acetylene black throughout this specification and appended claims means an acetylene black which has not been milled into the composition of the layer in which it is incorporated.

It is contemplated that a heating device of the type described may be applied to wooden as well as metal propeller blades and to various other parts of aircraft, such as wing surfaces and the like. Modern developments have made available a substantial increase in the amount of electrical power which it is possible to supply on aircraft. Accordingly, it is contemplated that a sheet heating means of the type described may be employed to heat the cabins of aircraft.

It will, however, be apparent that the heating means of the present invention is subject to advantageous use on other than aircraft parts and it will be understood that the invention is not to be regarded as restricted in use except as defined in the appended claims.

We claim:
1. Means for preventing or removing ice or frost on aircraft propellers comprising a laminated sheet constructed and arranged to be applied to the leading portion of the propeller and to substantially conform to the normal contour of the propeller, said sheet having an inner insulating layer, an intermediate electrically conducting layer containing acetylene black and constituting a heating element, and an outer protecting layer, said sheet through at least substantially 85% of its area having an overall thickness not substantially exceeding 0.065 inch.

2. Means for preventing or removing ice and frost on aircraft propellers adapted to be adhesively secured to the normal surface of a propeller blade comprising a laminated sheet constructed and arranged to be applied to the leading portion of the propeller and to substantially conform to its contour, said sheet having an inner electrically conductive layer containing acetylene black and constituting a heating element of a thickness not substantially more than 0.023 inch and having an input capacity of not less than 1.5 watts per square inch, an insulating layer between the propeller blade and the heating element having thickness throughout the major portion of its area not exceeding 0.030 inch, and an outer exposed protective layer of a thickness throughout the major portion of its area not less than 0.005 inch, the overall thickness of the sheet throughout at least substantially 85% of its area not exceeding 0.065 inch.

3. Means for preventing or removing ice and frost on aircraft propellers as defined in claim 1 including electrodes for said heating element located at opposed edges of said conductive layer, and means for supplying electrical power to said electrodes to provide a power input to said layer of at least 1½ watts per square inch, the specific resistivity of said layer being less than 5 ohm centimeters.

4. Means for preventing or removing ice and frost on aircraft propellers as defined in claim 1 wherein that portion of the heating element extending over the leading edge of the blade to points lying on approximately the 10% chord of the blade is of less thickness than the remaining portion of the element whereby the heat generated by such leading edge portion is proportionally greater than that generated by said remaining portion.

5. A device as defined in claim 1 having a plurality of electrodes comprising a connected pair of wires located at opposite edges of said heating element and a second pair of separate wires located in said heating element in proximity to said leading edge and on opposite sides thereof, and a three-phase power supply for said electrodes.

6. A device as defined in claim 1 having means providing variation of power input in portions of said heating element comprising a plurality of electrodes therein and a multiphase power supply therefor.

7. Means for preventing or removing ice on aircraft propellers as defined in claim 2, wherein that portion of the area of said protective layer lying over the leading edge tip portion of the blade is of a thickness approximately 0.012 inch greater than that of the major portion theerof.

8. Means for preventing or removing ice on aircraft propellers as defined in claim 2, wherein that portion of the area of said protective layer lying over the leading edge tip portion of the blade is of a thickness approximately 0.012 inch greater than that of the major portion thereof, and wherein said insulating layer has a thickened portion in substantially opposed relation to the thickened portion of said protective layer, said insulating layer thickened portion being approximately 0.012 inch greater than that of the major portion thereof.

9. Means for preventing or removing ice on aircraft propellers as defined in claim 2, wherein said conductive layer has a portion reduced in thickness by approximately 0.006 inch extending along the longitudinal axis of said layer, said portion being adapted to lie opposite to the leading edge of the propeller blade and extending throughout not more than approximately one-third of the area of said layer.

10. A device as defined in claim 1 wherein said heating element consists of a matrix being one of a group consisting of rubber and synthetic resin and 25 to 55 parts of unmilled acetylene black per 100 parts of matrix.

THOMAS RAYMOND GRIFFITH.
JOHN LEWIS ORR.